United States Patent [19]

Numata et al.

[11] Patent Number: 5,109,904

[45] Date of Patent: May 5, 1992

[54] SNOW TIRE

[75] Inventors: Kazuki Numata, Nishinomiya; Kiyoshi Ochiai, Kobe, both of Japan

[73] Assignee: Sumitomo Rubber Industries, Ltd., Hyogo, Japan

[21] Appl. No.: 478,406

[22] Filed: Feb. 12, 1990

[30] Foreign Application Priority Data

Feb. 17, 1989 [JP] Japan ..................... 1-38922

[51] Int. Cl.⁵ .................... B60C 11/11, 11/12
[52] U.S. Cl. .................... 152/209 R152/DiG 3
[58] Field of Search ........ 152/209 R, 209 D, DIG. 3; D12/140, 146-151

[56] References Cited

U.S. PATENT DOCUMENTS

| Re. 30,549 | 3/1981 | Mirtain et al. ............... 152/209 R X |
| D. 269,336 | 6/1983 | Yurkovich .................... D12/146 |
| D. 271,958 | 12/1983 | Gorez ........................ D12/147 |
| D. 277,272 | 1/1985 | Sladky et al. ................ D12/146 |
| D. 282,456 | 2/1986 | Larsen et al. ................ D12/147 |
| D. 286,522 | 11/1986 | Hatakenaka ................... D12/146 |
| D. 296,541 | 7/1988 | Gettys et al. ................ D12/147 |
| 2,272,879 | 2/1942 | Hargraves ................. 152/DIG. 3 X |
| 4,031,938 | 6/1977 | Verdier ...................... 152/209 R |
| 4,055,209 | 10/1977 | Senger ....................... 152/209 R |
| 4,222,423 | 9/1980 | Jamain ....................... 152/209 R |
| 4,515,197 | 5/1985 | Motomura et al. .............. 152/209 R |
| 4,690,189 | 9/1987 | Bradisse ..................... 152/209 R |

FOREIGN PATENT DOCUMENTS

| 0026608 | 2/1983 | Japan ................. 152/209 D |
| 0113607 | 5/1987 | Japan ................. 152/209 R |
| 0137003 | 6/1988 | Japan ................. 152/209 D |

Primary Examiner—Michael W. Ball
Assistant Examiner—Nancy T. Krawczyk

Attorney, Agent, or Firm—Birch, Stewart, Kolasch & Birch

[57] ABSTRACT

A snow tire which has tread blocks provided with slits extending between the side edges of the block, and the slit comprises: the first part extending axially of the tire from one side edge toward the other side edge of the block; the second part extending axially of the tire from the said other side edge toward said one side edge of the block; and the third part extending obliquely with respect to the tire axial direction to connect the first part with the second part, wherein the depth of the slit is varied in the tire axial direction to form a shallow portion and a deep portion, the axial length of the first part is more than 0.25 times and less than 0.48 times the total axial length of the slit, the axial length of the second part is more than 0.25 times and less than 0.48 times the total axial length of the slit, the ratio between the axial length of the first part to the axial length of the second part is more than 0.8 and less than 1.2, the axial length of the third part is more than 0.04 times and less than 0.5 times the total axial length of the slit, the circumferential length of the third part is more than 0.04 times and less than 0.5 times the total axial length of the slit, the ratio of the depth of the deep portion of the slit to the depth of a circumferential groove which extends circumferentially of the tire to define said blocks is not less than 0.6 and not more than 0.8, the ratio the depth of the shallow portion of the slit to said depth of the circumferential groove is not less than 0.3 and not more than 0.55, and the ratio of the axial length of the shallow portion of the slit to the total axial length of the slit is not less than 0.25 and not more than 0.4, whereby uneven wear of the blocks is lessened without deteriorating the on-the-snow performance.

6 Claims, 6 Drawing Sheets

SNOW TIRE

BACKGROUND OF THE INVENTION

The present invention relates to a snow tire and more particularly a block type tread pattern which can mitigate uneven wear of the blocks caused by slits provided on the blocks.

Recently, as the use of spiked tires has been regulated for dust pollution, the use of studless tires has been increased instead. The studless tires usually have a block type tread pattern in which tread blocks are provided with narrow grooves or cuts to increase edges to thereby maintain road grip on snowy roads.

However, as such narrow grooves and cuts for studless tire blocks have been formed to have a straight configuration and a constant depth in the tire axial direction, the divided parts of the block and also the block as a whole are moved easily, which causes the so-called heel and toe wear when running on an ordinary road. Here, the heel and toe wear is an uneven wear between the front edge and rear edge of the tread element.

SUMMARY OF THE INVENTION

It is therefore an object of the present invention to provide a snow tire in which heel and toe wear is prevented by increasing the block-rigiddity without causing a deterioration in the on-snow performances.

According to one aspect of the present invention, a tread is provided with blocks having at least one zigzag slit. The slit has a width of more than 0.2 mm and less than 0.8 mm and the slit extends between the side edges of the block, and comprises a first part, a second part and a third part. The first part extends axially of the tire from one side edge toward the other side edge of the block, the second part extends axially of the tire from the said other side edge toward said one side edge of the block, and the third part extends obliquely with respect to the tire axial direction to connect the first part with the second part. The depth of the slit is varied in the tire axial direction to form a shallow portion and a deep portion. The axial length of the first part is more than 0.25 times and less than 0.48 times the total axial length of the slit and the axial length of the second part is more than 0.25 times and less than 0.48 times the total axial length of the slit. The ratio between the axial length of the first part to the axial length of the second part is more than 0.8 and less than 1.2 and the axial length of the third part is more than 0.04 times and less than 0.5 times the total axial length of the slit. The circumferential length of the third part is more than 0.04 times and less than 0.5 times the total axial length of the slit and the ratio of the depth of the deep portion of the slit to the depth of a circumferential groove whch extends circumferentially of the tire to define said blocks, is not less than 0.6 and not more than 0.8. The ratio of the depth of the shallow portion of the slit to said depth of the circumferential groove is not less than 0.3 and not more than 0.55, and the ratio of the axial length of the shallow portion of the slit to the total axial length of the slit is not less than 0.25 and not more than 0.4.

BRIEF DESCRIPTION OF THE DRAWINGS

The embodiments of the present invention will now be described in detail by way of example and only with reference to the drawings, in which.

DETAILED DESCRIPTION OF THE INVENTION

In FIGS. 1-5, a tire 1 of the present invention is provided with three circumferential grooves G1, G2 and axial grooves K. The central circumferential groove G1 is disposed along the tire equator CO and the lateral circumferential grooves G2 are disposed one on each side of the tire equator. The axial grooves K are extended between the groove G1 and the groove G2, and also between the tread edge (a) and the groove G2. The tread part 2 in this example is therefore, provided with four rows of blocks including two center block rows UC located one on each side of the tire equator CO and two shoulder block rows US located adjacent to the respective tread edges.

Figure 1:
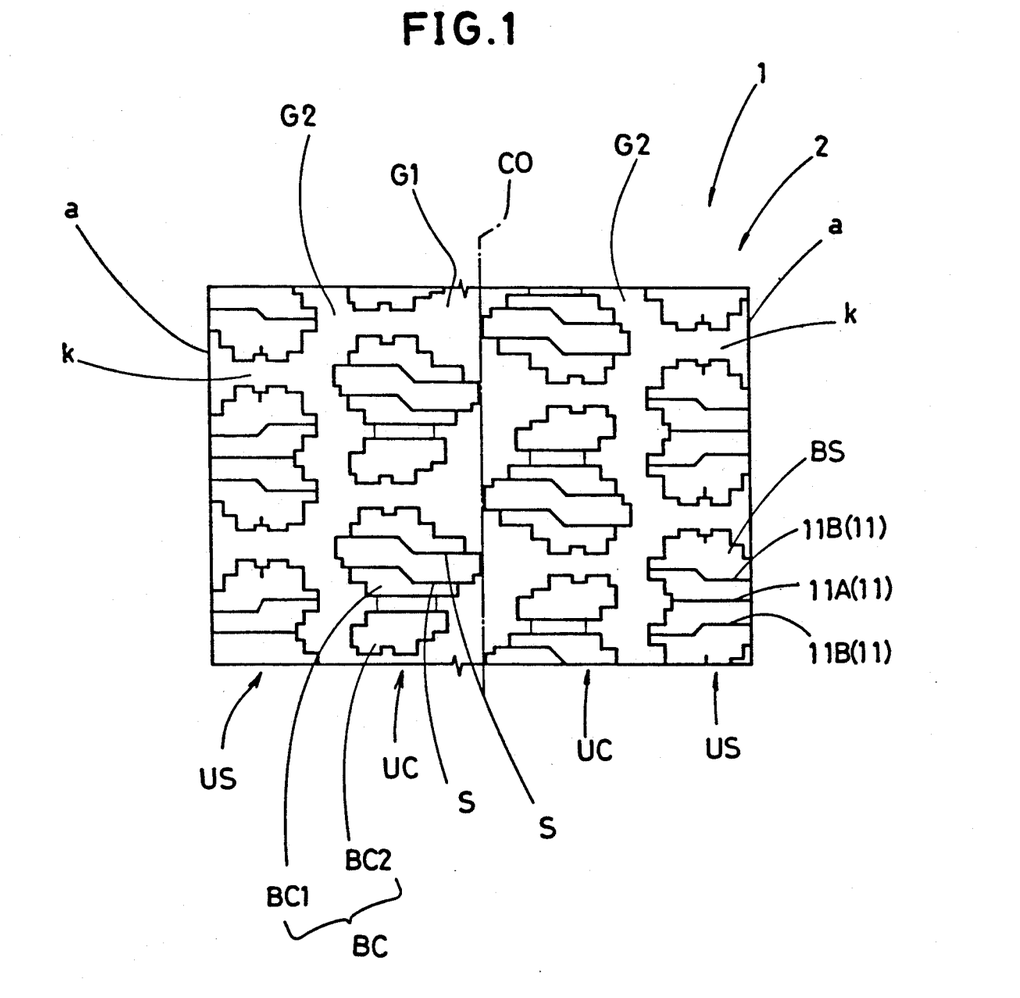
FIG. 1 is a tread pattern showing an embodiment of the present invention.

Each center block row UC is made up of center blocks BC having side edges defined by the circumferential grooves G1 and G2 and a front edge and a rear edge defined by the axial grooves K.

Each shoulder block row US is made up of shoulder blocks BS having a side edge defined by the tread edge (a) and a side edge defined by the circumferential groove G2 and a front edge and a rear edge defined by the axial grooves K.

Further, the block walls are formed in stepped or zigzagged configurations with projecting portions being provided especially on the side edges, whereby the resultant angled portions can improve the snow grip performance.

The land ratio of the tread pattern, which is defined as a ratio SA/SB of the total of the top surface areas of all the blocks in the tread part 2 to the total surface area SB of the tread part, is 0.4 to 0.75, more preferably 0.5 to 0.7. When the land ratio SA/SB is more than 0.75, the road grip performance on snowy and icy roads deteriorates. When the land ratio is less than 0.4, the ground contacting area becomes too small to run stably on an ordinary road.

From this point of view and also from the point of view of uniformity, the total number of the block rows is set to be at least four, preferably four or five, and the number of blocks in each row is set to be more than 25 and less than 60. When the block number is not more than 25, the block rigidity in the circumferential direction of the tire is too large which deteriorates its on-snow performances, or alternatively width becomes too large which deteriorates the riding comfort. On the contrary, when the block number is more than 60, the circumferential block rigidity becomes too small, and the road grip, wear resistance, durability and the like are reduced.

Figure 2:
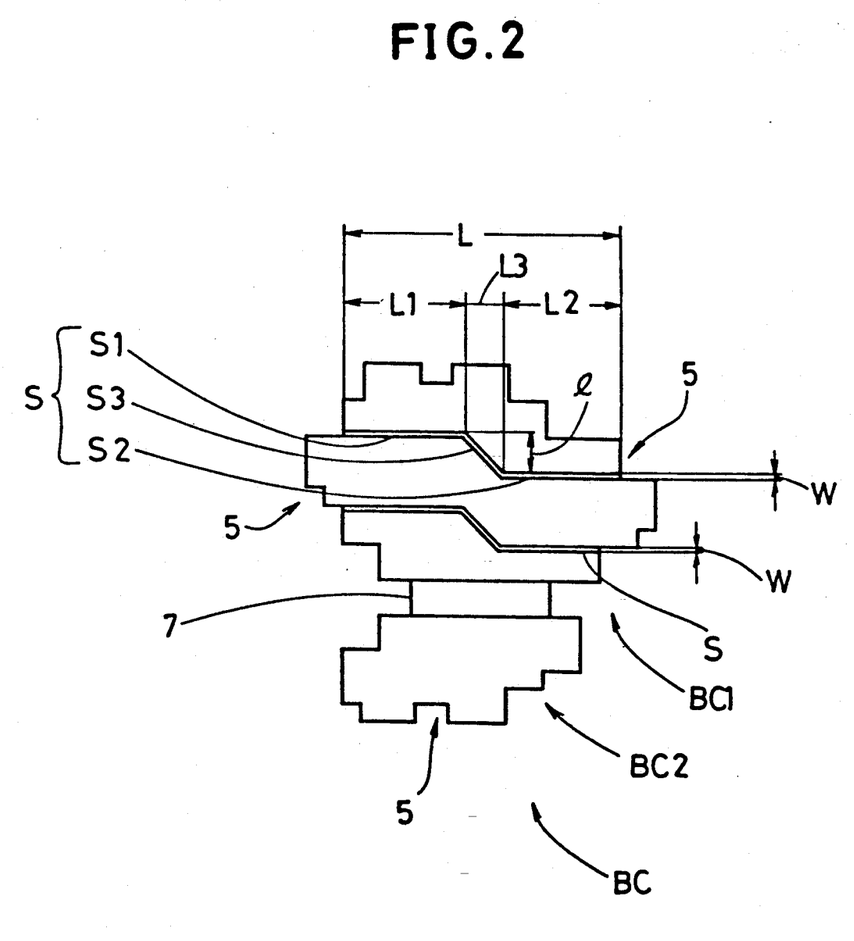
FIG. 2 is a enlarged plan view of a tread block showing the slits.

In this embodiment, as shown in FIG. 2, the above-mentioned center block BC is provided with an axially extending straight wide groove 7 which is shallower than the circumferential grooves so as to subdivided the block into a major block part BC1 and a minor block part BC2. As a result, the center block row UC appears, as shown in FIG. 1, to be made up of two kinds of alternately arranged blocks, those having a larger size BC1 in the circumferential direction and those having a smaller size BC2 disposed between the large sized blocks. Thus, the ground pressure is varied in the circumferential direction of the tire and as a result the blocks are improved in their degree of pushing into the snow.

Further, the center block BC is provided with at least one narrow slit S extending from one side edge to the other side edge thereof. The width W of the slits is more than 0.2 mm and less than 0.8 mm. In this example, two parallel slits S are formed in the major block part BC1.

The slit S comprises at least three parts S1, S2, S3. The first part S1 extends substantially parallel to the axial direction of the tire from one side edge toward the other side edge. Similarly the second part S2 extends substantially parallel to the axial direction of the tire from the other side edge toward one side edge. The inner ends of the first and second parts do not overlap with each other and are shifted from each other in both the axial and circumferential directions. The third part S3 extends between the inner ends to connect the first part with the second part. Further, in this embodiment, the outer ends of the first and second parts S1 and S2 of the slit, that is, the ends of the silt are located at corners 5 of the stepped walls to open thereat. Thus, as the third part S3 is slanted with respect to the tire axial direction, the slit is provided with a zigzag configuration, whereby the rigidity of the block as a whole against forces in the circumferential direction and axial direction of the tire is heightened.

In order to further enhance such effects, the axial length L1 of the first part and the axial length L2 of the second part in each slit are set to be more than 0.25 times and less than 0.48 times the total axial length L of the slit.

Further, the axial length L3 and the circumferential length 1 of the third part S3, in other words, the amount of the above-mentioned shift of the inner ends of the first and second parts in the axial direction and that in the circumferential direction are set to be more than 0.04 times and less than 0.5 times the total axial length L. When L1 and L2 are more than 0.48 L and L3 is less than 0.04 L, the full effect can not be expected. On the contrary, when L1 and L2 are less than 0.25 L and L3 is more than 0.5 L, the axial component of traction produced by the third part becomes too large to maintain the running stabliity.

In order to maintaining the running stability, it is preferable to set the ratio 1/L3 of the circumferential length 1 to the axial length L3 of the third part within the range of 0.375 to 2.7 in addition to the selection of the length 1 from the range of 0.04 L to 0.5 L.

Furthermore, the ratio L1/L2 between the lengths L1 and L2 is set to be more than 0.8 and less than 1.2, thereby balancing the traction and breaking forces produced by the first and second parts to prevent unbalance between the left side and right side of the block.

For example, in a tire size of 10.00 R20, the ranges for L1, L2, L3 and 1 are respectively 4.0 to 30 mm, 4.0 to 30 mm, 3.0 to 8.0 mm and 3.0 to 8.0 mm.

Figure 3:
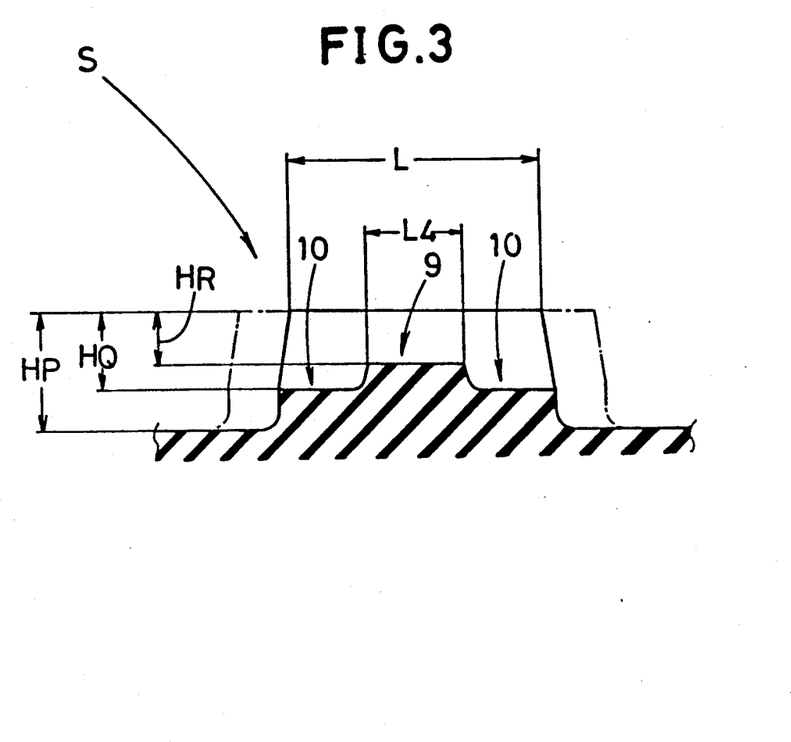
FIG. 3 is a sectional view thereof.

FIG. 3 shows a structure for the bottom of the slit.

The depth of the slit is varied in the tire axial direction to form a central shallow portion 9 and lateral deep portions 10.

The ratio HQ/HP of the depth HQ of the deep portions to the depth HP of the circumferential groove is not less than 0.6 and not more than 0.8, more preferably 0.6 to 0.7.

The ratio HR/HP of the depth HR of the shallow portion to the depth HP is not less than 0.3 and not more than 0.55, more preferably 0.4 to 0.5.

The ratio L4/L of the axial length L4 of the shallow portion to the total axial length of the slit is not less than 0.25 and not more than 0.4, more preferably 0.3 to 0.35.

The rigidity of the center block in thereby, partly increased, and the resistance against a circumferential force is improved to lessen uneven wear.

Figure 4A:
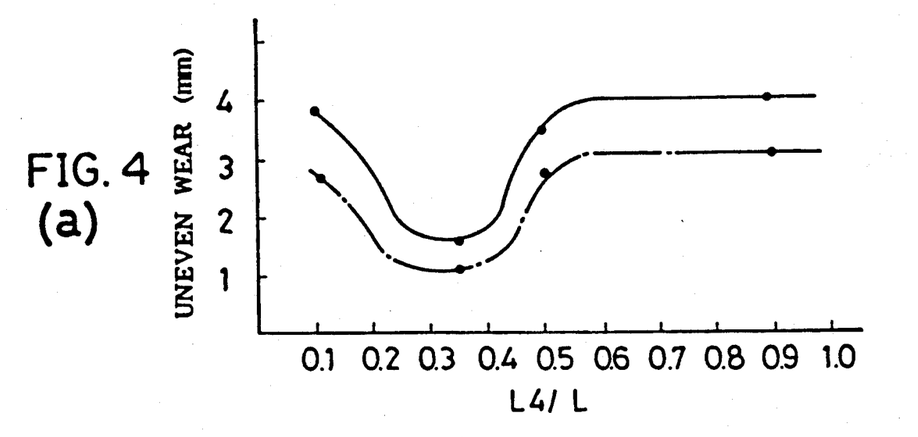
FIG. 4(a) is a graph showing the relationship between the amount of uneven wear and the L4/L ratio of the shallow part length L4 to the total length L.
Figure 4B:
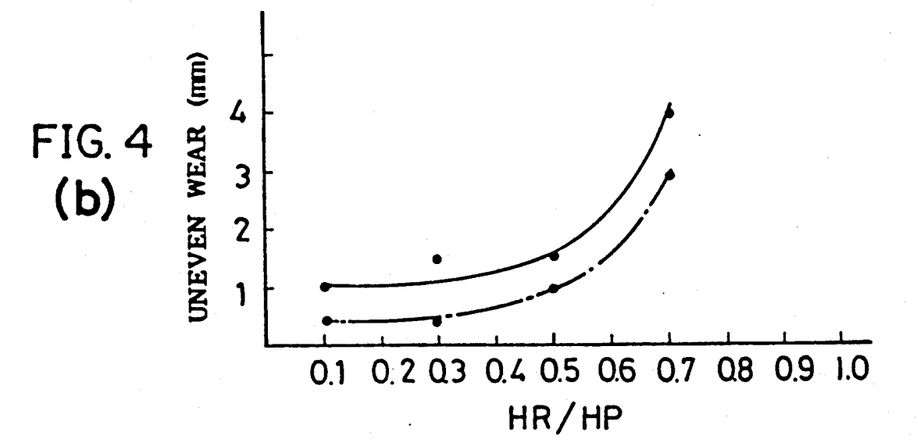
FIG. 4(b) is a graph showing the relationship between the amount of uneven wear and the HR/HP ratio of the shallow part depth HR to the circumferential groove depth HP.
Figure 4C:
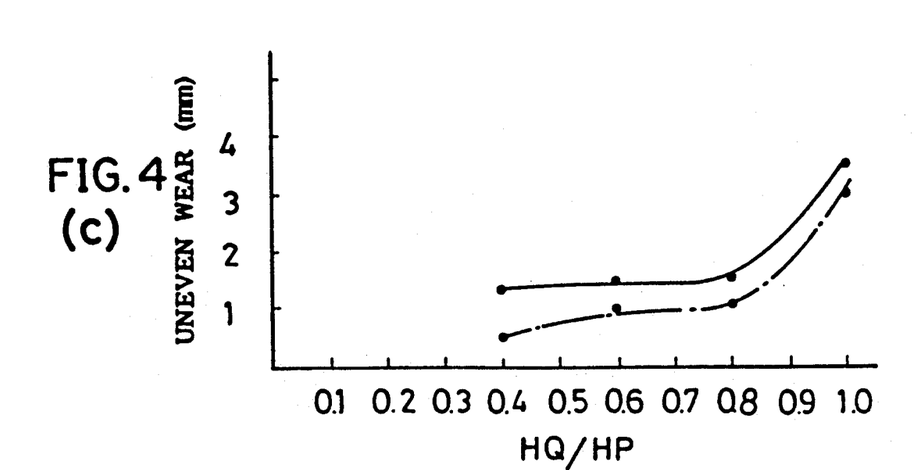
FIG. 4(c) is a graph showing relationship between the amount of uneven wear and the HQ/HP ratio of the deep part depth HQ to the circumferential groove depth HP.
Figure 4D:
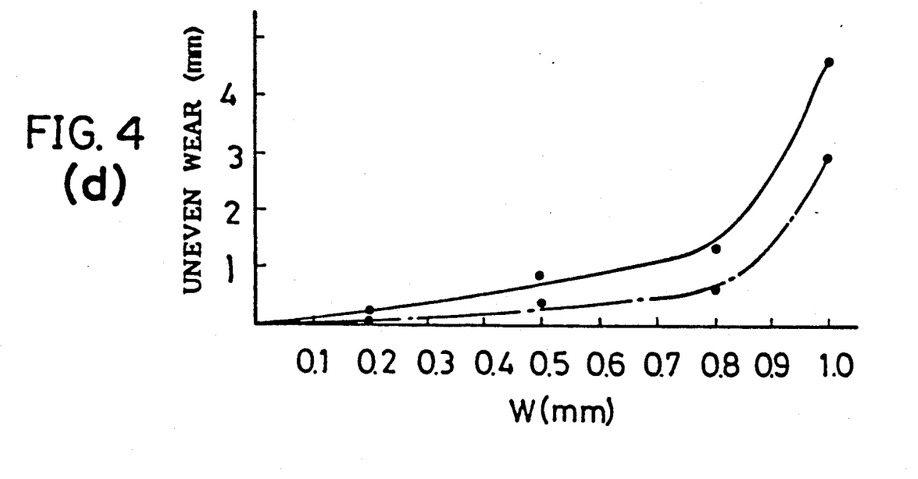
FIG. 4(d) is a graph showing the relationship between the amount of uneven wear and the slit width W.
Figure 4E:
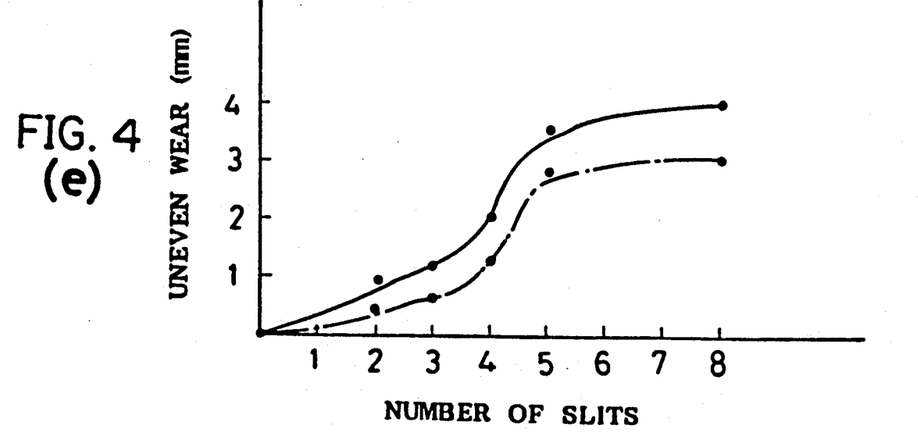
FIG. 4(e) is a graph showing the relationship between the amount of uneven wear and the nunber of slits.

FIGS. 4(a)-(e) are graphs showing the results of field tests which were conducted by the present inventors, wherein:

FIG. 4(a) shows the relationship between uneven wear and the length ratio L4/L of the shallow portion under the test conditions shown in Table 1 except for L4;

FIG. 4(b) shows the relationship between uneven wear and the depth ratio HR/HP of the shallow portion under the test conditions shown in Table 1 except for HR;

FIG. 4(c) shows the relationship between uneven wear and the length ratio HQ/HP of the deep portion under the test conditions shown in Table 1 except for HQ;

FIG. 4(d) shows the relationship between uneven wear and the width W of the slit under the test conditions shown in Table 1 except for W; and FIG. 4(e) shows the relationship between uneven wear and the number of slits per one block under the test conditions shown in Table 1 except for the number of slits.

In FIGS. 4(a)-(e), the full lines indicate the maximum of the uneven wear and the chain lines indicate the minimum of the uneven wear.

TABLE 1

| | |
|---|---|
| Vehicle | 2-2.D wheel type truck |
| Tire position | front wheels (fixed) |
| Tire size | 10.00 R20 |
| Tire pressure | 9.2 KSC |
| Running distance | 7,000 km |
| Tread pattern | FIG. 1 |
| Slit: | |
| 1st part axial length L1 | 19.0 mm (=0.44 L) |
| 2nd part axial length L2 | 19.0 mm (=0.44 L) |
| 3rd part axial length L3 | 5.0 mm (=0.12 L) |
| 3rd part circumferential length 1 | 6.0 mm (=0.14 L) |
| Shallow part axial length L4 | 0.35 L |
| Shallow part depth HR | 0.4 HP |
| Deep part depth HQ | 0.7 HP |
| Slit width | 0.5 mm |
| Number of slits | 2 |

As apparent from FIGS. 4(a), (b) and (c), the amount of uneven wear became increased when the length L4 was less than 0.25 L, or the length L4 was more than 0.4 L or the depth HR was more than 0.55 HR or the depth HQ was more than 0.8 HP. However, when the depth HQ and HR are respectively less than 0.6 HP and 0.3 HP, the effects of the slits are decreased earlier as the tread wears.

As shown in FIG. 4(d), when the slit width W was more than 0.8 mm, uneven wear increased, and when W was less than 0.2 mm, the road grip performance on the snowy and icy roads was decreased.

As shown in FIG. 4(e), when the number of slits was more than four, the amount of uneven wear was increased. From this, it is preferable to form two or three slits per one block.

Further, in this embodiment, the above-mentioned shoulder blocks BS are provided with three slits 11 including an axially extending straight slit 11A and two zigzag slits 11B disposed one on each side thereof in the tire circumferential direction. The zigzag slits 11B are symmetric with respect to the straight slit 11A and the circumferential distance between the zigzag slits becomes wider toward the axially inside.

Figure 5:
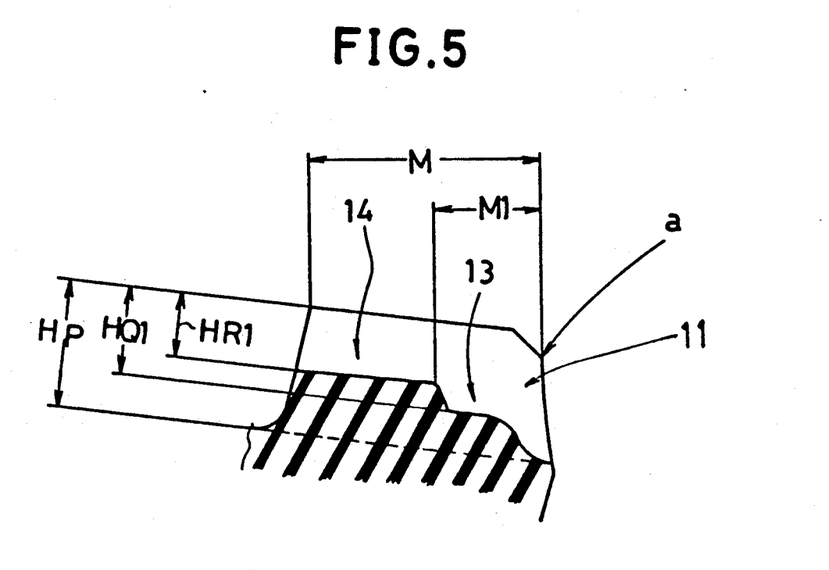
FIG. 5 is a sectional view of a shoulder block.

As shown in FIG. 5, each of the slits 11A and 11B is varied in depth to provide a deep portion 13 and a shallow portion 14 axially inward thereof. The deep portion extends from the tread edge (a) which is generally the axially outer side edge of the block to a position spaced apart a distance M1 inward therefrom in the tire axial direction, which distance M1 is more 0.25 times and less 0.40 times the total axial length M of the slit. The shallow portion extends from the M1 position to the axially inner sid edge of the block.

The depth HR1 of the shallow portion 14 is more than 0.3 times and less than 0.55 times the depth HP of the circumferential groove, and the depth HQ1 of the deep portion 13 is more than 0.6 times and less than 0.8 times the depth HP of the circumferential groove, whereby uneven wear caused by the slits 11 can be prevented.

Figure 6:
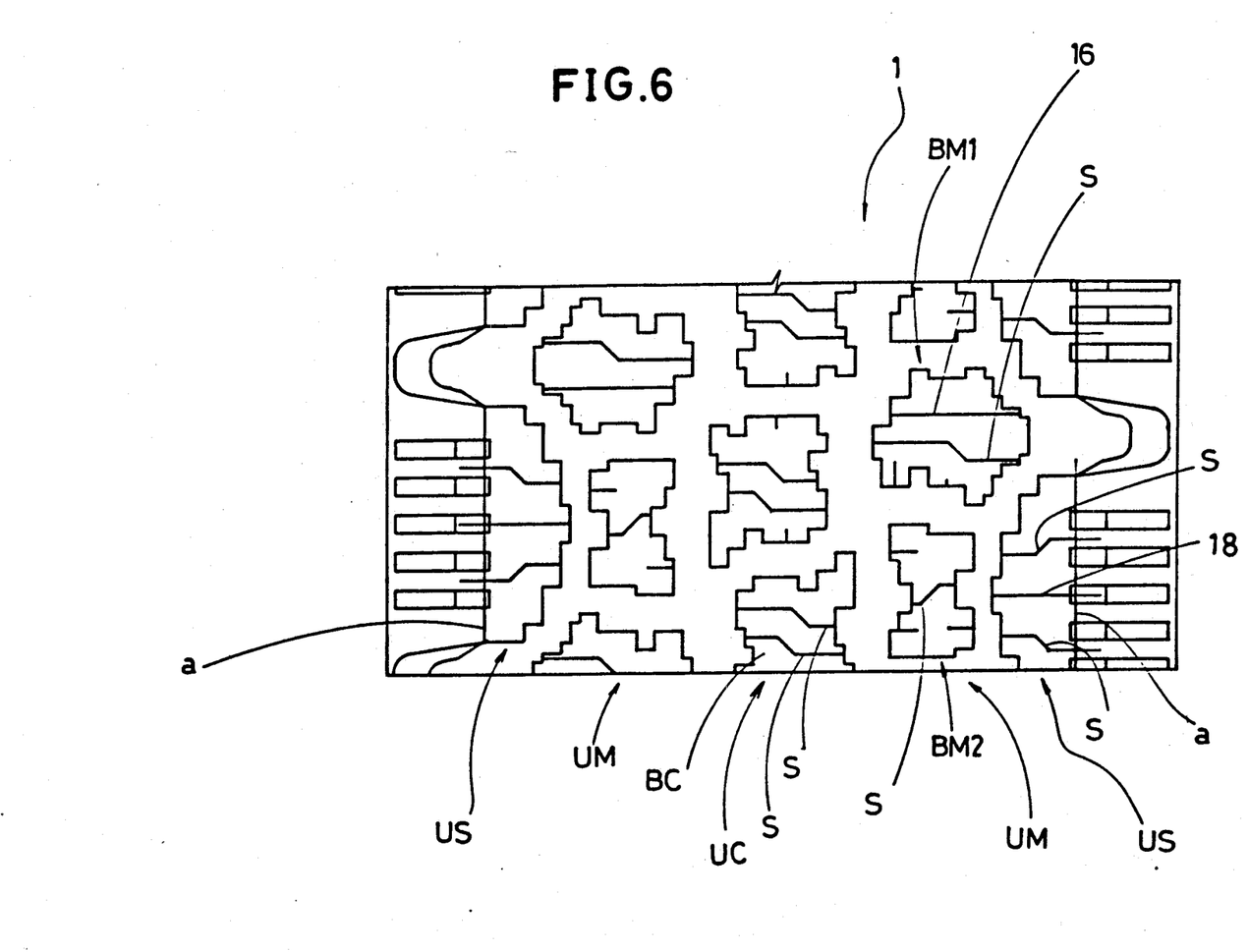
FIG. 6 is a partial plan view showing another embodiment of the present invention.

FIG. 6 shows another embodiment of the present invention, in which the tire 1 is provided with five block rows including a row UC of center blocks BC arranged on the tire equator, two rows US of shoulder blocks BS arranged along the thread edges (a), and two rows UM of middle blocks BM1 and BM2 located therebetween. In this embodiment, each of the center blocks and the middle blocks and the shoulder blocks is provided with at least one slits S, and each center block is provided with two parallel slits S, and the middle blocks BM1 and the shoulder blocks BS are further provided with axially extending straight slilts 16 and 18.

As explained above, the slits S according the to the invention must be formed in the or each center block row UC, but the row UC may contain blocks not provided with any slit or the slit S. In this case, the number of the center block provided with a plurality of slits which includes at least one slit S should be more than 30%, more preferably more than 40% of the total number of the center blocks. Further, at least one block which is provided with a plurality of slits which includes at least one slit S should exist in the ground contacting patch.

Test tires of size 10.00R20 having a radial carcass were made as working example tires and reference tires by way of trial. The test tires had an identical construction except for tread patterns. The specifications thereof are shown in Table 2.

TABLE 2

| Tire<br>Tread pattern | | Ex. 1<br>FIG. 1 | Ex. 2<br>FIG. 1 | Ex. 3<br>FIG. 1 | Ref. 1<br>FIG. 1 *1 | Ref. 2<br>FIG. 1 *1 |
|---|---|---|---|---|---|---|
| Slit in Center block | | | | | | |
| Slit width | W | 0.7 mm | 0.7 mm | 0.7 mm | 0.7 mm | 0.7 mm |
| 1st part axial length | L1 | 0.44 L/19 mm | 0.44 L/19 mm | 0.44 L/19 mm | | |
| 2nd part axial length | L2 | 0.44 L/19 mm | 0.44 L/19 mm | 0.44 L/19 mm | | |
| 3rd part axial length | L3 | 0.12 L/5 mm | 0.12 L/5 mm | 0.12 L/5 mm | | |
| 3rd part circum. length | l | 0.14 L/6 mm | 0.14 L/6 mm | 0.14 L/6 mm | | |
| Shallow part axial length | L4 | 0.35 L/15 mm | 0.35 L/15 mm | 0.23 L/10 mm | | |
| Shallow part depth | HR | 0.5 HP/10 mm | 0.3 HP/6 mm | 0.3 HP/6 mm | | |
| Deep part depth | HQ | 0.7 HP/14 mm | 0.7 HP/14 mm | 0.7 HP/14 mm | 0.5 HP/10 mm | 0.7 HP/14 mm |
| Slit in Shoulder block | | | | | | |
| Shallow part axial length | L4A | 0.35 L/15 mm | 0.35 L/15 mm | 0.23 L/10 mm | | |
| Shallow part depth | HR1 | 0.5 HP/10 mm | 0.5 HP/10 mm | 0.3 HP/6 mm | | |
| Deep part depth | HQ1 | 0.7 HP/14 mm | 1.0 HP/20 mm | 0.5 HP/10 mm | 0.5 HP/10 mm | 0.7 HP/14 mm |
| Uneven wear | (index) *2 | | | | | |
| Center blocks | | 84 | 84 | 69 | 100 | 105 |
| Shoulder blocks | | 88 | 82 | 65 | 100 | 106 |
| Snow performance | (index) *3 | 105 | 110 | 100 | 100 | 105 |

*1: The working example tires (Ex. 1-3) had the tread pattern shown in FIG. 1, and the reference tires (Ref. 1-2) had a tread pattern same as that shown in FIG. 1 except that straight slits having a constant depth were formed instead of the slits S.
*2: The test tires were mounted on the front wheels of a 2-2-D wheel type truck, and after 7135 km running on a normal road under a normal tire load and tire pressure of 7.25 ksc, heal and toe wear, the maximum difference in the amount of wear between both sides of the slit in the tire circumferential direction was measured at the center blocks and the shoulder blocks. In the table, the data are expressed by an index regarding the reference tire 1 as 100. The smaller the index, the better the resistance to uneven wear.
*3: The breaking distance on a test course covered with trodden snow, that is, the running distance to stop when the wheels were locked at 40 km/h was measured. In the table 2, the data are expressed by an index based on the assumption that the reference tire 1 is 100, wherein the larger the index, the better the snow performance.

As apparent from Table 2, the working example tires 1-3 were superior to the reference tires 1-2 in the wear resistance.

As described above, in the snow tires according to the present invention, the slits have a specific zigzag configuration and a specific shallow portion is provided in the slit. Therefore, the blocks provided with the slits are partly heightened in rigidity in comparison with blocks provided with straight slits, and the occurrence of uneven wear is effectively controlled without deteriorating the snow performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A tire having a tread comprising at least a first plurality of blocks and a second plurality of blocks, each block of the first plurality of blocks and of the second plurality of blocks having a side wall formed in a stepped configuration so as to provide a projection portion on the side edge thereof, each block of the first plurality of blocks having at least one slit having a width of more than 0.2 and less than 0.8 mm, the slit extending between the side edges of the block, and comprising a first part, a second part and a third part, the first part extending axially of the tire from one side edge toward the other side edge of the block, the second part extending axially of the tires from the said other side edge toward said one side edge of the block, the third part extending obliquely with respect to the tire axial direction to connect the first part with the second part, the depth of the slit varied in the tire axial direction to form a shallow portion and a deep portion, the axial length of the first part being more than 0.25 times and less than 0.48 times the total axial length of the slit, the axial length of the second part being more than 0.25 times and less than 0.48 times the total axial length of the slit, the ratio between the axial length of the first part to the axial length of the second part being more than 0.8 and less than 1.2, the axial length of the third part being more than 0.04 times and less than 0.5 times the total axial length of the slit, the circumferential length of the third part being more than 0.04 times and less than 0.5 times the total axial length of the slit, the ratio of the depth of the deep portion of the slit to the depth of a circumferential groove which extends circumferentially of the tire to define the blocks of the first plurality of blocks, being not less than 0.6 and not more than 0.8, the ratio of the depth of the shallow portion of the slit to said depth of the circumferential groove being not less than 0.3 and not more than 0.55, the ratio of the axial length of the shallow portion of the slit to the total axial length of the slit being not less that 0.25 and not more than 0.4, and each block of the first plurality of blocks having an axially extending straight wide groove which is shallower than the circumferential groove to subdivide each block into a major part and a minor part.

2. The tire according to claim 1, wherein said tread comprises at least two circumferential rows of blocks of the first plurality of blocks and at least two circumferential rows of blocks of the second plurality of blocks, at least one row of blocks of the first plurality of blocks being located in the tread center region, and the number of the blocks contained in each of the rows is more than 25 and less than 60.

3. The tire according to claim 1, wherein the ends of each slit of each block of the first plurality of blocks are located at corners of the stepped walls to open thereat.

4. The tire according to claim 1, wherein at least one block of the second plurality of blocks is provided with two zigzag slits disposed one on each side of an axial straight line therebetween symmetrically with respect to this axial straight line.

5. The tire according to claim 1, wherein at least one block of the second plurality of blocks are provided with two zigzag slits and an axially extending straight slit disposed therebetween, and said two zigzag slits are symmetric with respect to the straight slit.

6. The tire according to claim 1, wherein each block of the second plurality of blocks has at least one slit having a width of more than 0.2 mm and less than 0.8 mm, the depth of the slit varied in the tire axial direction to form a shallow portion and a deep portion, the ratio of the depth of the deep portion of the slit to the depth of a circumferential groove which extends circumferentially of the tire to define the blocks of the second plurality of blocks, being more than 0.6 and less than 0.8, the ratio of the depth of the shallow portion of the slit to said depth of the circumferential groove being more than 0.3 and less than 0.55, and the ratio of the axial length of the shallow portion of the slit to the total axial length of the slit being more than 0.25 and less than 0.4.

* * * * *